United States Patent [19]
Fujiki et al.

[11] Patent Number: 5,366,805
[45] Date of Patent: Nov. 22, 1994

[54] POLYCARBONATE RESIN/SILICONE RUBBER INTEGRALLY MOLDED ARTICLE AND METHOD FOR MAKING

[75] Inventors: Hironao Fujiki, Takasaki; Shigeki Shudo; Akira Matsuda, both of Annaka; Noriyoshi Ogawa; Toshiaki Takata, both of Toyonaka, all of Japan

[73] Assignee: Shin-Etsu Chemical Company, Ltd., Tokyo, Japan

[21] Appl. No.: 163,543

[22] Filed: Dec. 9, 1993

[30] Foreign Application Priority Data

Dec. 10, 1992 [JP] Japan .................. 4-352676

[51] Int. Cl.$^5$ .................. B32B 27/28; B32B 25/20; B29K 69/00; B29C 45/16
[52] U.S. Cl. .................. 428/412; 427/387; 264/255; 525/464
[58] Field of Search .................. 428/412; 427/387; 264/255; 525/463, 464

[56] References Cited

U.S. PATENT DOCUMENTS

| | | | |
|---|---|---|---|
| 3,652,715 | 3/1972 | Holub | 525/468 |
| 4,257,936 | 3/1981 | Matsumoto et al. | 528/31 |
| 4,556,606 | 12/1985 | Olson | 428/412 |
| 5,286,813 | 2/1994 | Morioka | 525/468 |

FOREIGN PATENT DOCUMENTS 0249336 12/1987 European Pat. Off. .
3445108 6/1986 Germany .

*Primary Examiner*—David Buttner
*Attorney, Agent, or Firm*—Birch, Stewart, Kolasch & Birch

[57] ABSTRACT

In a polycarbonate resin/silicone rubber integrally molded article, a polycarbonate resin having an aliphatic unsaturated group, typically an isopropenyl group is integrally joined to an addition type silicone rubber containing a tackifier component at high bond strength. It is prepared by injection molding a modified polycarbonate resin into a preform, injection molding a silicone rubber composition over the preform, and curing the composition at a temperature below the softening point of the polycarbonate resin.

31 Claims, 4 Drawing Sheets

POLYCARBONATE RESIN/SILICONE RUBBER INTEGRALLY MOLDED ARTICLE AND METHOD FOR MAKING

BACKGROUND OF THE INVENTION

1. Field of the Invention

This invention relates to an integrally molded article of polycarbonate resin and silicone rubber which is useful in the areas of electric equipment, electronic equipment, automobiles, precision machines and the like and a method for preparing the same.

2. Prior Art

A number of methods have been proposed for providing a bond between addition curing type silicone rubber and organic resins. It is known for example, to form a bond by applying a primer to a surface of molded resin, applying uncured silicone rubber material thereto and curing the silicone rubber to the resin or by curing self-adhesive silicone rubber compositions directly to molded resin. For the self-adhesive silicone rubber compositions, a number of proposals have been made on their tackifier component.

As another approach, it is known from Japanese Patent Publication (JP-B) No. 34311/1990 to add an organohydrogenpolysiloxane containing at least 30 mol % of hydrogen atoms directly attached to silicon atoms to an organic resin so that the resin is bondable with addition curing type silicone rubber. JP-B 45292/1988 discloses integration by physically fitting silicone rubber within molded organic resin. In Japanese Patent Application Kokai (JP-A) No. 183843/1988, a compound having an aliphatic unsaturated group and a hydrolyzable group attached to a silicon atom is grafted to an olefin resin and silicone rubber is bonded and integrated with the grafted olefin resin. Furthermore, as we previously proposed, a thermoplastic resin can be bonded and integrated to a silicone rubber composition when a compound having an unsaturated group and a hydrogen atom directly attached to a silicon atom is added to the resin (U.S. Ser. No. 07/965,303 and EP 0540259 A1).

However, several problems arise with these prior art methods for integrating silicone rubber and organic resin into a one-piece article. The primer method is cumbersome in that a once molded resin shape must be taken out of the mold before the primer can be applied thereto. The method of applying and curing a self-adhesive silicone rubber composition to molded resin has the serious problem that if the resin and silicone rubber are molded into a one-piece member using a mold, the silicone rubber itself sticks to the mold.

Where a self-adhesive addition curing type silicone rubber material is applied and cured to a resin preform, the resulting bond strength is insufficient for use as a one-piece member if the resin is a polycarbonate resin.

Where organohydrogenpolysiloxane is added to olefin resin, the properties of the resin itself can be altered thereby, preventing the resin from exerting its own properties. The physical engagement method leaves a possibility that the two segments be disengaged by physical forces. The use of an olefin resin having grafted thereto a compound having an aliphatic unsaturated group and a hydrolyzable group attached to a silicon atom cannot dispense with a primer when it should be joined to addition curing type silicone rubber.

In these years, silicone rubber has found a spreading use in the fields of electric and electronic equipment and automobiles because it is recognized highly reliable in the aspects of heat resistance, weatherability and electrical properties. To meet such a demand, there is a desire to have integral moldings in which thermosetting resin, especially polycarbonate resin and silicone rubber are firmly united or bonded together.

SUMMARY OF THE INVENTION

Therefore, an object of the present invention is to provide a polycarbonate resin/silicone rubber integrally molded article wherein the polycarbonate resin and the silicone rubber are joined at a practically acceptable bond strength. Another object is to provide a method for preparing such a polycarbonate resin/silicone rubber integrally molded article in a simple reliable manner within a short time, typically by an injection molding technique.

Although the prior art techniques failed to bond an addition curing type silicone rubber composition to a polycarbonate resin within a short time partially because the silicone rubber composition had a low bonding force, we have found that an integrally molded article in which silicone rubber and polycarbonate resin are joined at a practically acceptable bond strength can be produced in a simple manner by using a modified polycarbonate resin having an aliphatic unsaturated group as the polycarbonate resin and using an addition curing type silicone rubber containing a tackifier component having a SiH group and an alkoxysilyl, glycidyl, or acid anhydride group or a phenyl skeleton as the silicone rubber to be integrally joined to the polycarbonate resin. Particularly when a compound having a SiH group and a phenyl skeleton is used as the tackifier component, the silicone rubber composition can be molded over the polycarbonate resin by an injection molding technique and cured thereto within a short time to provide a firm bond. At the same time, the silicone rubber itself is releasable from the mold in a practically acceptable manner. Such an integrally molded article of polycarbonate resin/silicone rubber has never been available in the art.

According to a first aspect of the present invention, there is provided an integrally molded article in which a polycarbonate resin having an aliphatic unsaturated group or a composition containing the same is integrally joined to an addition type silicone rubber containing a tackifier component.

According to a second aspect of the present invention, there is provided a method for preparing a polycarbonate resin/silicone rubber integrally molded article, comprising the steps of:

molding a polycarbonate resin having an aliphatic unsaturated group or a composition containing the same into a preform, contacting with a surface of the preform an adhesive silicone rubber composition containing (a) an alkenyl group-containing organopolysiloxane, (b) an organohydrogenpolysiloxane having at least two hydrogen atoms each directly attached to a silicon atom in a molecule, (c) an addition reaction catalyst, and (d) a tackifier component, curing the silicone rubber composition at a temperature lower than the softening point of the polycarbonate resin or composition containing the same.

DETAILED DESCRIPTION OF THE INVENTION

Figure 1:
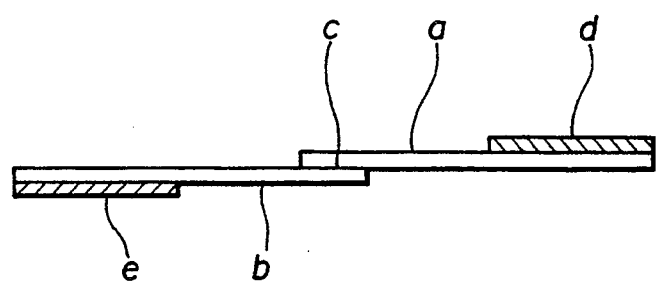
FIGS. 1A and 1B are side and plan views of an adhesion test piece.
Figure 1:
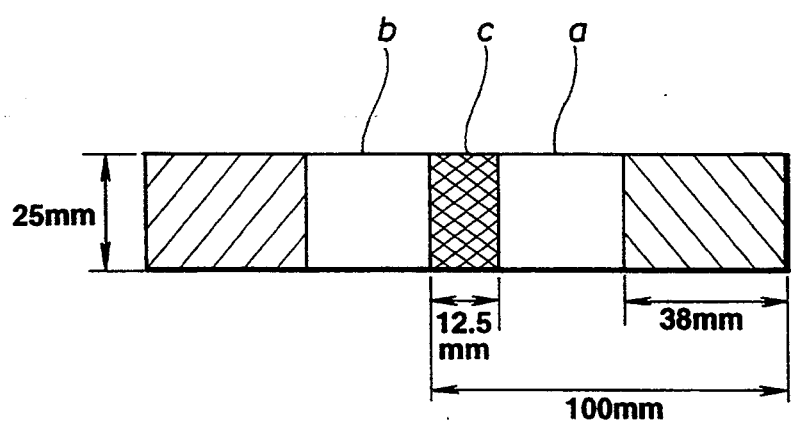

A polycarbonate resin having an aliphatic unsaturated group is used herein. This modified polycarbonate resin should contain on average at least one aliphatic unsaturated double or triple bond in a molecule including the backbone and terminal groups. Those resins containing a double bond are preferred since most resins containing a triple bond are relatively less resistant against weathering and heat. The unsaturated double bond contained in the resin may be any of olefinic ones, preferably vinyl, allyl and isopropenyl groups. It is preferred that the double bond is not of an internal olefin.

The polycarbonate resins which are modified with an aliphatic unsaturated group within their molecule can be prepared by the same methods as are conventional aromatic polycarbonate resins except that a dihydric phenol having an aliphatic unsaturated bond is used as the starting reactant and/or a mono-functional compound having an aliphatic unsaturated bond is used as the molecular weight modifier or terminal stopper. Such methods include interfacial polymerization methods and solution polymerization methods such as pyridine and chloroformate methods. Preferably the polycarbonate resins have a viscosity average molecular weight of about 2,000 to 100,000, especially about 5,000 to 30,000.

Dihydric phenols represented by the following general formula (A) are preferred for use in the preparation of the unsaturated group-bearing polycarbonate resin used herein.

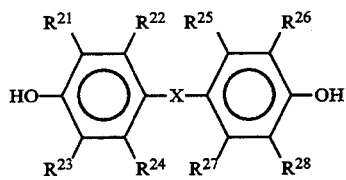

In formula (A), each of $R^{21}$ to $R^{28}$ is a hydrogen atom, a halogen atom or a substituted or unsubstituted alkyl, alkoxy, aryl or alkenyl group having 1 to 10 carbon atoms, and X is selected from the following groups:

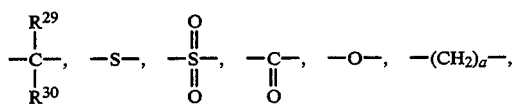

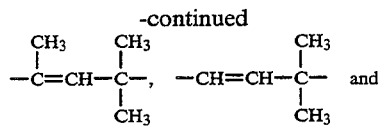

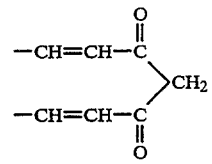

wherein each of $R^{29}$ and $R^{30}$ is a hydrogen atom, a halogen atom or a substituted or unsubstituted alkyl, aryl, alkenyl or alkyne group having 1 to 8 carbon atoms, or $R^{29}$ and $R^{30}$ taken together form a carbocyclic or heterocyclic ring, and letter a is an integer of at least 1.

Illustrative, non-limiting examples of the modified polycarbonate resin include 2,2-bis-(4-hydroxy-3-allylphenyl)propane, 2,4-bis(4-hydroxyphenyl)-4-methyl-1-pentene, 2,4-bis(4-hydroxyphenyl)-4-methyl-2-pentene, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1,-bis(4-hydroxyphenyl)ethane, 2,2-bis(4-hydroxyphenyl)propane (also known as bisphenol-A), 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, 2,2-bis(4-hydroxy-3-methylphenyl)propane, and 1,7-bis(4-hydroxy-3-methoxyphenyl)-1,6-heptadiene-3,5-dione (also known as curcumin). These dihydric phenols may be used alone or in admixture of two or more.

Examples of the monofunctional compound having an unsaturated double bond used for introducing an unsaturated terminal group include unsaturated carboxylic acids such as acrylic acid, methacrylic acid, vinylacetic acid, 2-pentenic acid, 3-pentenic acid, 5-hexenic acid, 9-decenic acid, and 9-undecenic acid; acid chlorides and chloroformares such as acrylic chloride, methacrylic chloride, sorbic chloride, allylchloroformate, and isopropenylphenylchloroformate; phenols having an unsaturated group such as isopropenylphenol, hydroxystyrene, o-allylphenol, eugenol, hydroxyphenylmaleimide, and allyl hydroxybenzoate; and vinylsilanes such as chloroformic dimethoxyvinylsilane and 3-carboxylpropyldiethoxyvinylsilane. These compounds may be used alone or in admixture of two or more. As long as at least one unsaturated double bond is contained in a polycarbonate resin molecule on average, a switch to a conventional terminal stopper such as phenol and p-tert-butylphenol is acceptable or it may be used in combination with the monofunctional compound having an unsaturated double bond. These terminal stoppers are generally used in amounts of about 1 to 25 mol %, preferably about 1.5 to 10 mol % per mol of the dihydric phenol.

Branched polycarbonates can be obtained by using branching agents in amounts of about 0.01 to 3 mol %, preferably about 0.1 to 1 mol % per mol of the dihydric phenol. Exemplary branching agents are polyhydroxy compounds such as fluoroglucin, 2,6-dimethyl-2,4,6-tri(4-hydroxyphenyl)heptene-3,4,6-dimethyl-2,4,6-tri(4-hydroxyphenyl)heptene-2, 1,3,5-tri(2-hydroxyphenyl)-benzole, 1,1,1-tri(4-hydroxyphenyl)ethane, 2,6-bis(2-hydroxy-5-methylbenzyl)-4-methylphenol, and α,α',α''-tri(4-hydroxyphenyl)1,3,5-triisopropylbenzene, as well as 3,3-bis(4-hydroxyphenyl)oxyindole (also known as isatinbisphenol).

Any of the unsaturated group-bearing polycarbonate resins mentioned above may be used in the polycarbonate resin/silicone rubber integrally molded article according to the present invention. Also useful are compositions obtained by blending such an unsaturated group-bearing polycarbonate resin (inclusive of an oligomer) with a conventional polycarbonate resin.

The silicone rubber to be integrally joined with the above-defined polycarbonate resin or a composition containing the same is an addition cured silicone rubber containing a tackifier component. Preferably the silicone rubber is obtained by curing an adhesive silicone rubber composition comprising (a) an alkenyl group-containing organopolysiloxane, (b) an organohydrogenpolysiloxane having at least two hydrogen atoms each directly attached to a silicon atom in a molecule, (c) an addition reaction catalyst, and (d) a tackifier component which is typically a compound containing at least one hydrogen atom directly attached to a silicon atom in a molecule and having a trialkoysilyl group, glycidyl group or acid anhydride group or a phenyl skeleton.

Component (a) is an organopolysiloxane containing an alkenyl group which may be selected from well-known organopolysiloxanes conventionally used as a major component of addition curing type silicone rubber compositions, typically having a viscosity of about 100 to 100,000 centipoise at room temperature.

Preferred organopolysiloxanes are represented by the general formula: $R_aSiO_{(4-a)/2}$ wherein R is a substituted or unsubstituted monovalent hydrocarbon group, preferably having 1 to 8 carbon atoms. Examples of the hydrocarbon group represented by R include alkyl groups such as methyl, ethyl and propyl; alkenyl groups such as vinyl, propenyl and butenyl; aryl groups such as phenyl and xylyl; and halo- or cyano-substituted hydrocarbon groups such as 3,3,3-trifluoropropyl. The monovalent hydrocarbon groups may be identical or different as long as an alkenyl group is contained in the organopolysiloxane molecule. The content of alkenyl group is preferably 0.01 to 10 mol %, especially 0.1 to 1 mol % of the entire R groups. Letter a is a number of 1.9 to 2.4. The organopolysiloxane may be a linear one or a branched one further containing a $RSiO_{3/2}$ unit or $SiO_{4/2}$ unit. The substituent on the silicon atom is basically any of the above-mentioned groups. It is desirable to introduce a vinyl group among the alkenyl groups and a methyl or phenyl group among other substituent groups.

Illustrative, non-limiting examples of the organopolysiloxane are given below.

-continued

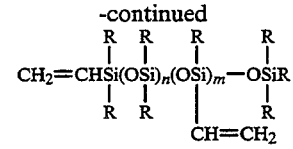

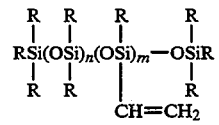

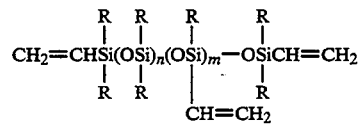

In these formulae, R is as defined above (excluding an aliphatic unsaturated group), and letters m and n are positive numbers meeting m+n=100 to 5000 and m/(m+n)=0.001 to 0.1.

The organopolysiloxanes may be prepared by per se known methods. For example, they are obtained by effecting equilibration reaction between an organocyclopolysiloxane and a hexaorganodisiloxane in the presence of an alkali or acid catalyst.

Component (b) is an organohydrogenpolysiloxane which serves as a crosslinking agent by reacting with component (a). It is not particularly limited in molecular structure and may be any of conventionally used organohydrogenpolysiloxanes of linear, cyclic and branched structures. However, it should have at least two hydrogen atoms each directly attached to a silicon atom in a molecule. The substituent or substituents attached to a silicon atom other than hydrogen are the same as the substituents described for organopolysiloxane (a).

Component (b) is preferably added in an amount to provide 0.4 to 5 equivalents, especially 0.8 to 2 equivalents per alkenyl group in component (a). Less than 0.4 equivalents of component (b) on this basis would result in cured silicone rubber having a too low crosslinking density and hence, less heat resistance. More than 5 equivalents of component (b) would give rise to a bubbling problem due to dehydrogenation reaction, also adversely affecting heat resistance.

The organohydrogenpolysiloxanes may be prepared by per se known methods. For example, the most commonly used method is by equilibrating octamethylcyclotetrasiloxane and/or tetramethylcyclotetrasiloxane and a compound containing a hexamethyldisiloxane or 1,1-dihydro-2,2,3,3-tetramethyldisiloxane unit which will become a terminal group in the presence of a catalyst such as sulfuric acid, trifluoromethanesulfonic acid, and methanesulfonic acid at a temperature between −10° C. and +40° C.

Component (c) is an addition reaction catalyst which is generally selected from platinum and platinum compounds. Since the catalyst is used for promoting curing addition reaction or hydrosilation between components (a) and (b), it may be a conventional known one. Exemplary are platinum black, chloroplatinic acid, alcohol modified chloroplatinic acid, complexes of chloroplatinic acid with olefins, aldehydes, vinylsiloxanes or acetylene alcohols. Rhodium complexes are also useful. The amount of the catalyst added is suitably determined in accordance with a desired curing rate although it is generally in the range of 0.1 to 1000 ppm, preferably 1 to 200 ppm of platinum or rhodium based on the total of the entire components.

Component (d) is a tackifier component which is a compound having at least one hydrogen atom directly attached to a silicon atom in a molecule and another bond in addition to a siloxane bond. Component (d) forms the essential part of the present invention. The minimum requirement for this compound is that it contains at least one hydrogen atom directly attached to a silicon atom in a molecule and it improves affinity to an organic resin (polycarbonate resin) to which the silicone rubber is to be joined.

To this end, many of conventional tackifier components proposed in the prior art are satisfactory. The use of these tackifier components can not provide silicone rubber with sufficient adherence to conventional polycarbonate resins, but to the specific polycarbonate resin having an unsaturated group capable of hydrosilylation as contemplated herein. That is, although none of the prior art techniques can firmly join silicone rubber to polycarbonate resins at a practical bond strength, the present invention selects a modified polycarbonate resin and then permits silicone rubber, coupled with a tackifier component, to form a practically acceptable bond to the polycarbonate resin.

The tackifier component (d) is preferably a compound containing at least one hydrogen atom directly attached to a silicon atom and at least one member selected from the group consisting of an alkoxysilyl group, glycidyl group and acid anhydride group. Examples of this compound are given below.

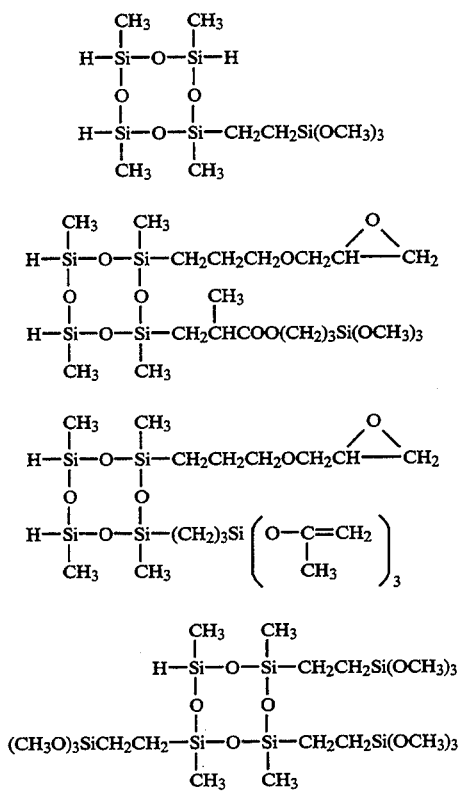

-continued

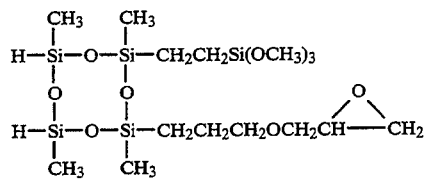

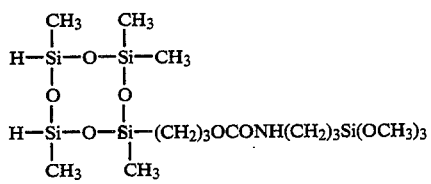

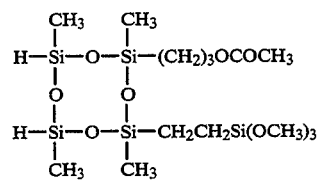

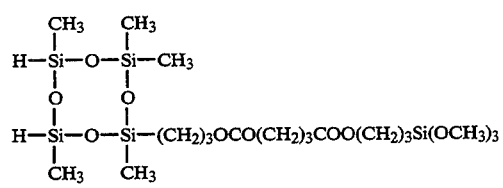

Any of the foregoing compounds may be used as tackifier component (d) to accomplish a sufficient bonding force between silicone rubber and polycarbonate resin. The use of these compounds, however, has the problem that when it is desired to mold silicone rubber to a certain shape using a metallic molding jig, typically a metallic mold, the silicone rubber will stick to the jig. One solution to this problem is to use a molding jig having a surface made of a less adhesive material, for example, by applying a Teflon ® resin coating to the jig surface. This solution is effective in some applications, but less reliable from the aspect of service life in other cases and unacceptable where the dimensional precision of a molded article on its surface is of importance.

Useful in such cases is a second class of compounds free of a tackifying functional group such as trialkoxysilyl, glycidyl and acid anhydride groups. It is to be noted that the first class of compounds having a tackifying functional group as mentioned above can be used without the problem insofar as the functional group is fully suppressed in reactivity by the stearic restraint or electronic action of a substituent group or neighbor group.

The tackifying compound which allows silicone rubber to provide a sufficient bond to a polycarbonate resin or a composition containing the same, but not to metal is preferably selected from compounds having at least one, more preferably at least two SiH groups in a molecule and at least one phenyl skeleton, especially those compounds having one of the following groups (1) to (6).

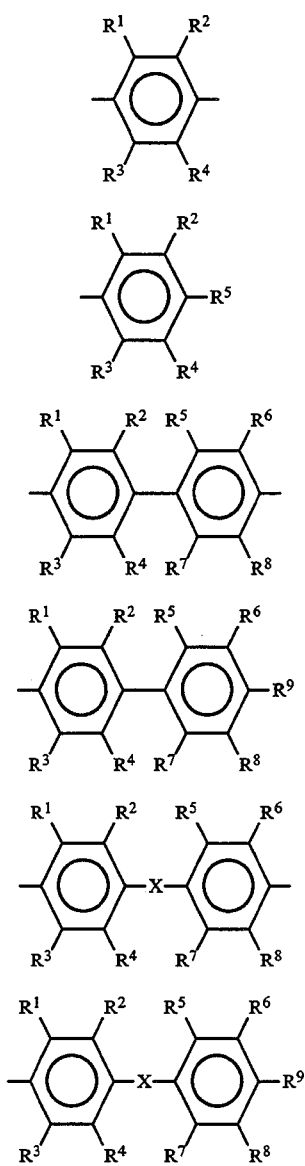

In the formulae, each of $R^1$ to $R^9$, which may be identical or different, is a monovalent group selected from the group consisting of a hydrogen atom, halogen atom, substituted or unsubstituted monovalent hydrocarbon group having 1 to 8 carbon atoms, and alkoxy group having 1 to 6 carbon atoms;

X is a divalent group selected from the group consisting of

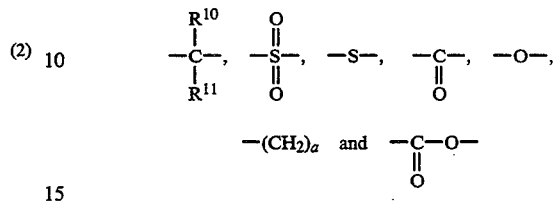

wherein each of $R^{10}$ and $R^{11}$, which may be identical or different, is a monovalent group selected from the group consisting of a hydrogen atom, halogen atom, and substituted or unsubstituted monovalent hydrocarbon group having 1 to 8 carbon atoms, or $R^{10}$ and $R^{11}$ taken together form a carbocyclic or heterocyclic ring, and letter a is an integer of at least 2.

Examples of the monovalent hydrocarbon group represented by $R^1$ to $R^{11}$ are as previously described for R. Examples of the carbocyclic and heterocyclic rings formed by $R^{10}$ and $R^{11}$ taken together are given below.

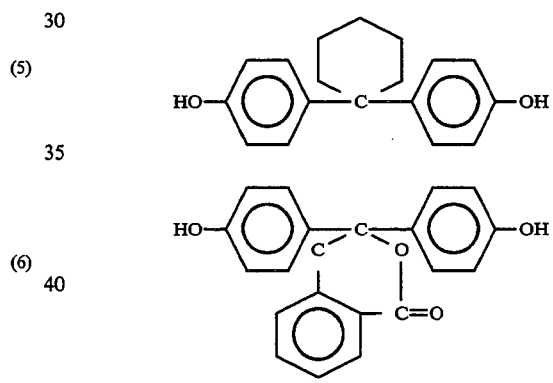

Exemplary compounds included in the second class of component (d) are given below. In the following formulae, $R^1$ to $R^8$ and X are as defined above.

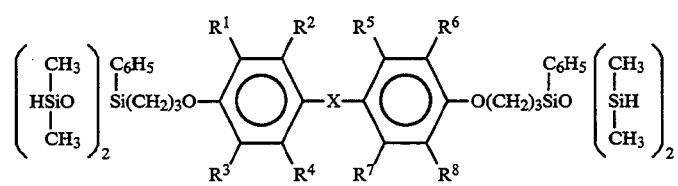

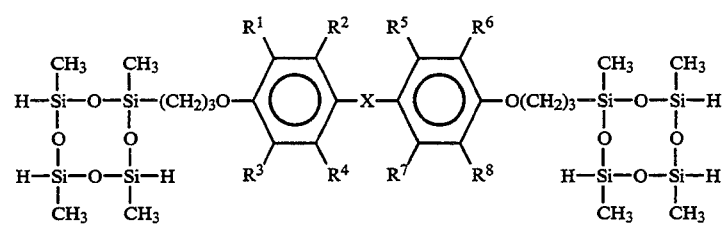

-continued

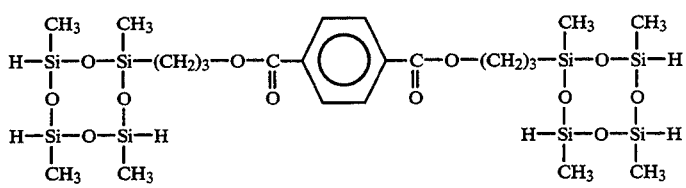

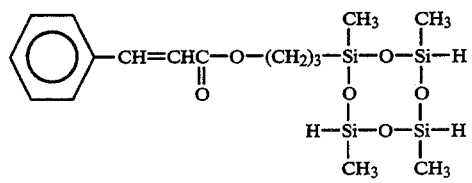

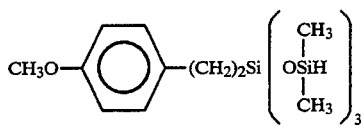

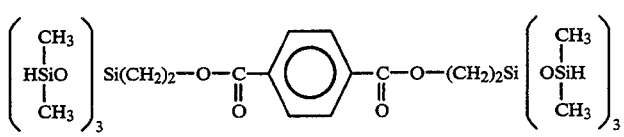

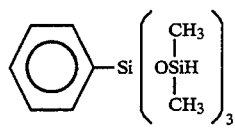

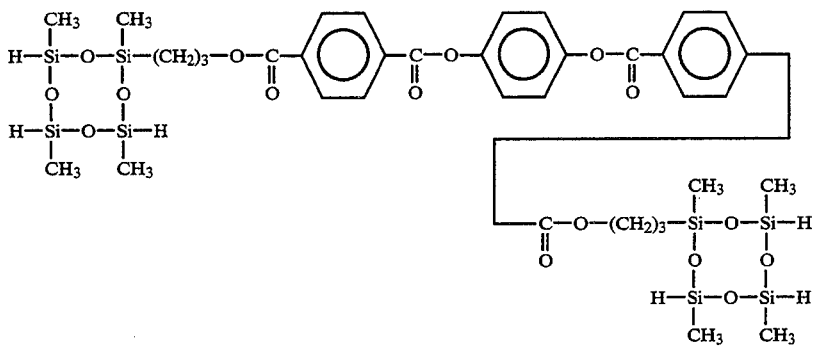

The amount of component (d) blended is properly determined without undue experimentation although it is preferably about 0.01 to 50 parts by weight, more preferably about 0.1 to 5 parts by weight per 100 parts by weight of component (a). Less than 0.01 part of component (d) is too small to provide adherence to the modified polycarbonate resin whereas more than 50 parts of component (d) would deteriorate the physical properties of silicone rubber.

In one preferred embodiment, the silicone rubber composition further includes component (e) in the form of finely divided silica having a specific surface area of at least 50 m²/g in an amount of 0 to 100 parts, preferably 5 to 50 parts, more preferably 10 to 40 parts by weight per 100 parts by weight of the total of components (a) and (b). The finely divided silica is to impart strength to an elastomer resulting from curing of the silicone rubber composition and should thus be reinforcing to silicone rubber, which requires a specific surface area of at least 50 m²/g. Exemplary of hydrophilic silica are Aerosil 130, 200 and 300 (commercially available from Nippon Aerosil K.K. and Degussa), Cabosil MS-5 and MS-7 (Cabot Corp.), Rheorosil QS-102 and 103 (Tokuyama Soda K.K.), and Nipsil LP (Nippon Silica K.K.). Exemplary of hydrophobic silica are Aerosil R-812, R-812S, R-972 and R-974 (Degussa), Rheorosil MT-10 (Tokuyama Soda K.K.), and Nipsil SS series (Nippon Silica K.K.).

In some cases, the curing time of the silicone rubber composition must be controlled in order that it be effective in practice. Then a suitable control agent is used. It may be selected from vinyl-containing organopolysiloxanes such as vinylcyclotetrasiloxane, triallylisocyanurate, alkyl maleates, acetylene alcohols and silane or siloxane modified derivatives thereof, hydroperoxides, tetramethylethylenediamine, benzotriazole and mixtures thereof. Also useful are platinum group compounds combined with organic resins and silicone resins.

Moreover, suitable additives may be blended in the silicone rubber composition. Such additives include non-reinforcing fillers such as ground quartz, diatomaceous earth, and calcium carbonate, coloring agents including inorganic pigments such as Cobalt Blue and organic dyes, and agents for improving heat resistance and flame retardance such as cerium oxide, zinc carbonate, manganese carbonate, iron oxide, titanium oxide, and carbon black.

The addition curing type silicone rubber composition is comprised of the essential and optional components mentioned above. The silicone rubber composition in uncured state is integrally molded over the polycarbonate resin by any desired technique, for example, by placing the uncured silicone rubber composition in a desired form on a preform of the polycarbonate resin and heating the assembly at a temperature below the softening temperature of the polycarbonate resin. Placement of the uncured silicone rubber composition in a desired form can be done by molding, coating or dipping. Another technique is by placing the uncured silicone rubber composition on a preform of the polycarbonate resin and heating and compressing the assembly at a temperature below the softening temperature of the polycarbonate resin. Alternatively, using an injection molding machine, the polycarbonate resin is first injection molded in a mold and then the silicone rubber composition is then heated and injected into the same mold.

In molding the unsaturated group-bearing polycarbonate resin into a preform, any of molding techniques commonly used for conventional thermoplastic resins may be employed. One exemplary known convenient technique includes pelletizing the polycarbonate resin, introducing the pellets into a mold heated above the softening point of the polycarbonate resin, and cooling the mold to below the softening point of the polycarbonate resin. This technique generally uses a machine known as an injection molding machine or transfer molding machine. Thereafter, the silicone rubber composition is molded over the polycarbonate resin preform. At this point, the silicone rubber composition may be liquid, putty or paste in uncured state. Desired for ease of molding is a liquid or paste one known as a liquid silicone rubber composition to those skilled in the art.

There has been described a polycarbonate resin/silicone rubber integrally molded article in which a polycarbonate resin having an aliphatic unsaturated group or a composition containing the same is used, and an addition type silicone rubber containing a tackifier component (d) is overlaid, joined and integrated to the polycarbonate resin so that a strong bond is established between the polycarbonate resin and the silicone rubber. This molded article finds application as parts in electric, electronic, automotive and precision equipment fields since it takes advantage of the properties of both polycarbonate resin and silicone rubber.

According to the method of the invention, such a polycarbonate resin/silicone rubber integrally molded article can be prepared in a simple reproducible manner. Molding of the polycarbonate resin or its composition and placement of the silicone rubber in contact with the polycarbonate resin preform can be accomplished by injection molding. Particularly when a compound having a phenyl skeleton, but free of an alkoxysilyl, glycidyl and acid anhydride group is used as tackifier component (d), the silicone rubber as molded and cured can be smoothly removed from the mold without sticking. Easy release of the silicone rubber from the metallic mold is one of the benefits of the invention.

EXAMPLE

Examples of the present invention are given below by way of illustration and not by way of limitation. All parts are by weight.

Example 1

A kneader was charged with 100 parts of a dimethylsiloxane polymer blocked with a dimethylvinylsilyl group at either end and having a viscosity of 10,000 centipoise at 25° C., 40 parts of fumed silica having a specific surface area of 300 cm²/g, 8 parts of hexamethyldisilazane, and 1 part of water. The contents were agitated and mixed at room temperature for one hour, heated to 150° C., and mixed for a further 2 hours at the room temperature. To the mixture were added 20 parts of the dimethylsiloxane polymer blocked with a dimethylvinylsilyl group at either end and having a viscosity of 10,000 centipoise at 25° C., 3 parts of a methylhydrogenpolysiloxane represented by formula (A) below and having a viscosity of about 10 centipoise at 25° C., 4 parts of a vinylmethylpolysiloxane containing 5 mol % of a vinyl group directly attached to a silicon atom and having a viscosity of 1,000 centipoise at 25° C., 0.1 part of acetylene alcohol for extending the curing time at room temperature, and 50 ppm calculated as platinum atom of a platinum vinylsiloxane complex. The mixture was fully mixed until uniform, obtaining a liquid addition type silicone rubber composition (I).

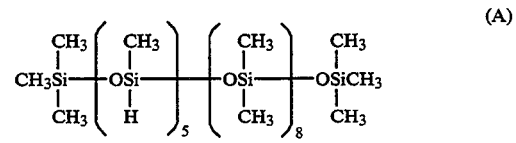
(A)

Composition (I) was pressed into a sheet at 120° C. for 10 minutes. upon measurement of mechanical properties, the sheet had a hardness of 40 on JIS A scale, an elongation of 500%, a tensile strength of 100 kgf/cm², and a tear strength of 35 kgf/cm.

To 100 parts of composition (I) was added 2 parts of a compound of formula (B) or (C) shown below as tackifier component (d). There were obtained silicone compositions within the scope of the invention.

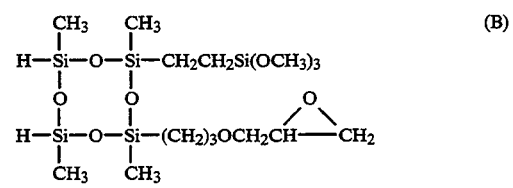
(B)

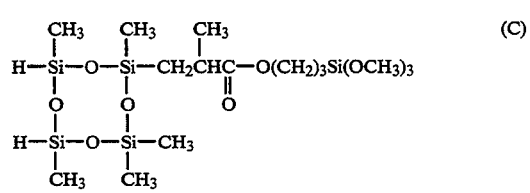
(C)

Separately, a polycarbonate resin end-modified with an isopropenyl group was admitted into a thermoplastic resin injection molding machine where the resin was plasticized at 290° C. and injected into a plurality of sheet-shaped mold cavities whereby a plurality of sheets of 25 mm wide, 100 mm long, and 2 mm thick were molded. The injection molding conditions included an injection time of 6 seconds, a cooling time of 30 seconds, an injection pressure of 1,000 kg/cm$^2$, a clamping pressure of 35 ton, and a cavity temperature of 100° C.

To a jig for forming shear adhesion test pieces was fixedly attached the polycarbonate resin sheet or each of chromium-plated metal, nickel-plated metal and aluminum alloy sheets of the same dimensions. A proper amount of the silicone composition was poured into the jig where it was cured by heating for 8 minutes in a 120° C. constant temperature oven, obtaining a test piece as shown in the side and plan views of FIGS. 1A and 1B. In FIG. 1, a polycarbonate resin sheet or metal sheet 12 is joined to a cured part of the silicone composition 14 (25×100×2 mm) through a bond zone 16. Supports 18 and 20 support the sheet 12 and the cured silicone part 14, respectively.

The test pieces were examined by an adhesion test. The results are shown in Table 1.

Comparative Example 1

Adhesive test pieces as shown in FIGS. 1A and 1B were prepared by the same procedure as in Example 1 except that the modified polycarbonate resin was replaced by an unmodified polycarbonate. The test pieces were examined for adhesion. The results are also shown in Table 1.

TABLE 1

|  | Example 1 | Comparative Example 1 |
|---|---|---|
| Modified polycarbonate | bonded | — |
| Chromium-plated metal | bonded | — |
| Nickel-plated metal | bonded | — |
| Aluminum alloy | bonded | — |
| Unmodified polycarbonate | — | separated |

Example 2

Several sheets of 25 mm wide, 100 mm long, and 2 mm thick were injection molded from the same polycarbonate resin by the same method under the same conditions as in Example 1.

Separately, to 100 parts of composition (I) was added 0.5 or 1 part of a compound of formula (D) or (E) shown below as tackifier component (d). There were obtained silicone compositions within the scope of the invention.

To a jig for forming shear adhesion test pieces was fixedly attached the polycarbonate resin sheet or each of chromium-plated metal, nickel-plated metal and aluminum alloy sheets of the same dimensions. A proper amount of the silicone composition was poured into the jig where it was cured by heating for 8 minutes in a 120° C. constant temperature oven, obtaining a test piece as shown in the side and plan views of FIGS. 1A and 1B. The test pieces were examined for adhesion. The results are shown in Table 2.

TABLE 2

| Formula (D) compount | 0.5 pbw | 1 pbw | — | — |
|---|---|---|---|---|
| Formula (E) compound | — | — | 0.5 pbw | 1 pbw |
| Chromium-plated metal | separated | separated | separated | separated |
| Nickel-plated metal | separated | separated | separated | separated |
| Aluminum alloy | separated | separated | separated | separated |
| Modified polycarbonate | bonded | bonded | bonded | bonded |

Example 3

Figure 2:
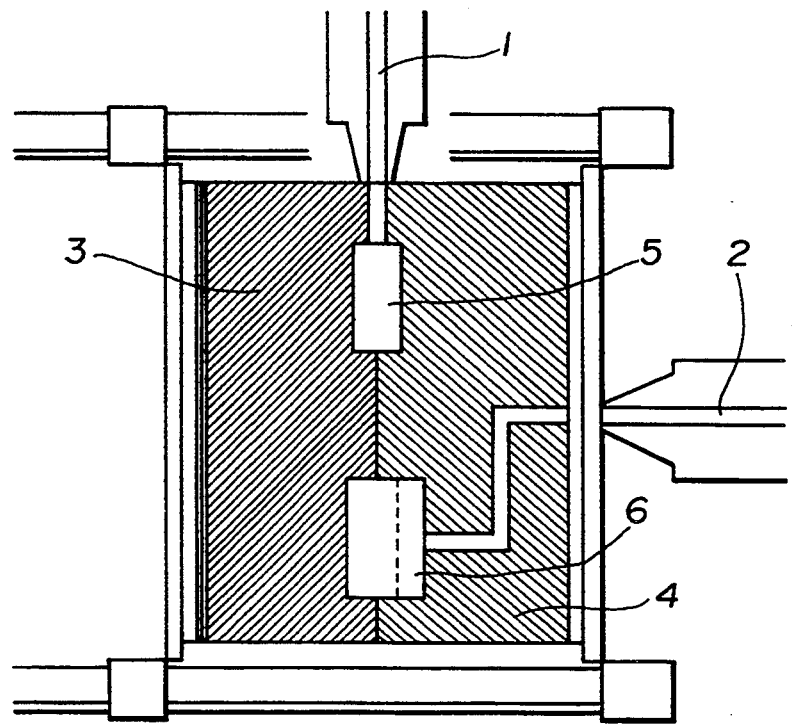
FIG. 2 is a schematic cross-sectional view of an injection molding machine used in preparing a molded article according to the present invention.

A two color injection molding machine including a pair of injectors was used herein. Referring to FIG. 2, the injectors include nozzles 1 and 2. A mold includes left and right mold halves 3 and 4 which are formed with opposed upper and lower recesses so that they define upper and lower cavities 5 and 6 when mated along a parting line. The nozzle 1 extends through the mold along the parting line for fluid communication with the upper mold cavity 5. The nozzle 2 extends through the right mold half 4 at the center of its right side surface for fluid communication with the lower mold cavity 6.

Figure 3:
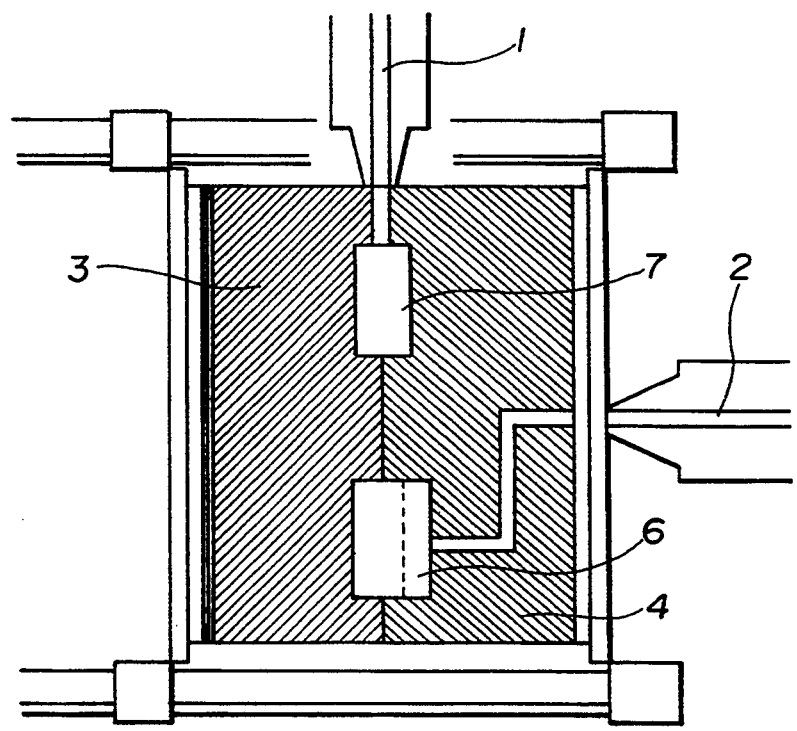
FIG. 3 is a schematic cross-sectional view similar to FIG. 2 at a stage when a polycarbonate resin is injection molded.

A polycarbonate resin end-modified with an isopropenyl group was admitted into the injection molding machine where it was melted at 290° C. and injected into the upper cavity 5 through the nozzle 1 to mold a polycarbonate resin sheet 7 as shown in FIG. 3. The injection molding conditions included an injection time of 6 seconds and a cooling time of 35 seconds while the upper cavity 5 and left mold half 3 were maintained at a temperature of 100° C.

Next, the right mold half 4 was removed to open the mold. With the resin sheet 7 left in the recess of the left mold half 3, the mold half 3 was rotated 180° about a horizontal axis. The right mold half 4 was mated again with the left mold half 3 and clamped together. Then a cavity for molding a silicone rubber sheet was defined between the exposed surface of the resin sheet 7 and the

Figure 4:
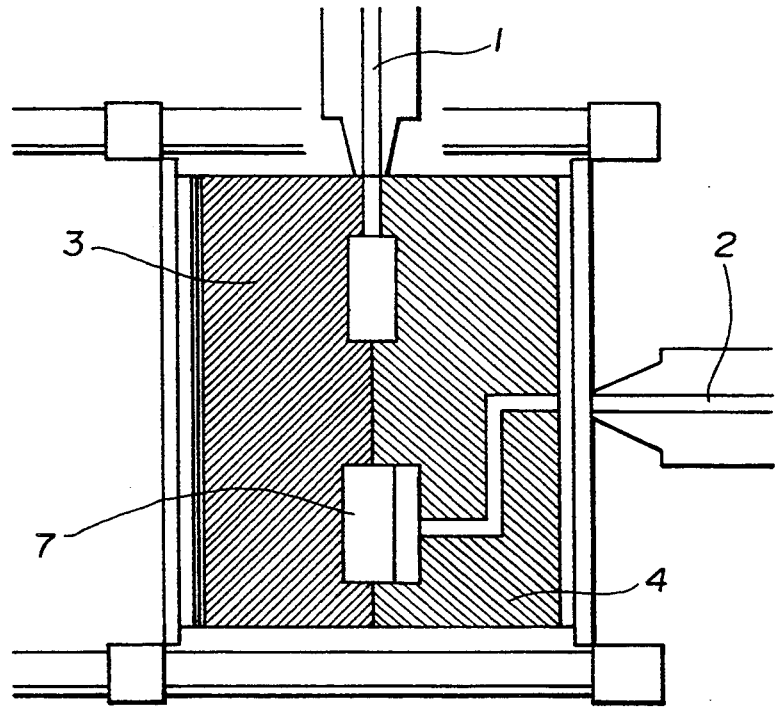
FIG. 4 is a schematic cross-sectional view similar to FIG. 2 at a stage when a left mold half is reversed.

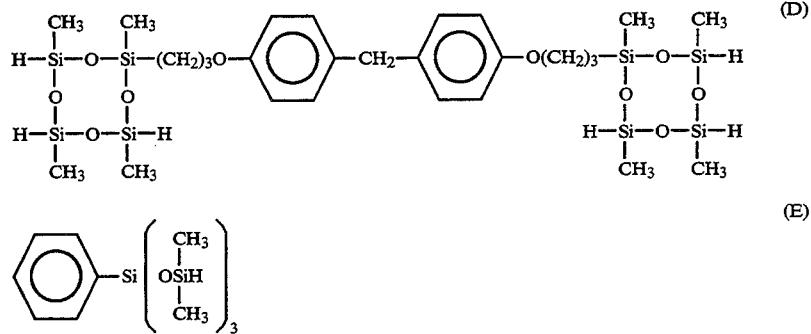

lower recess of the right mold half 4 as shown in FIG. 4.

Figure 5:
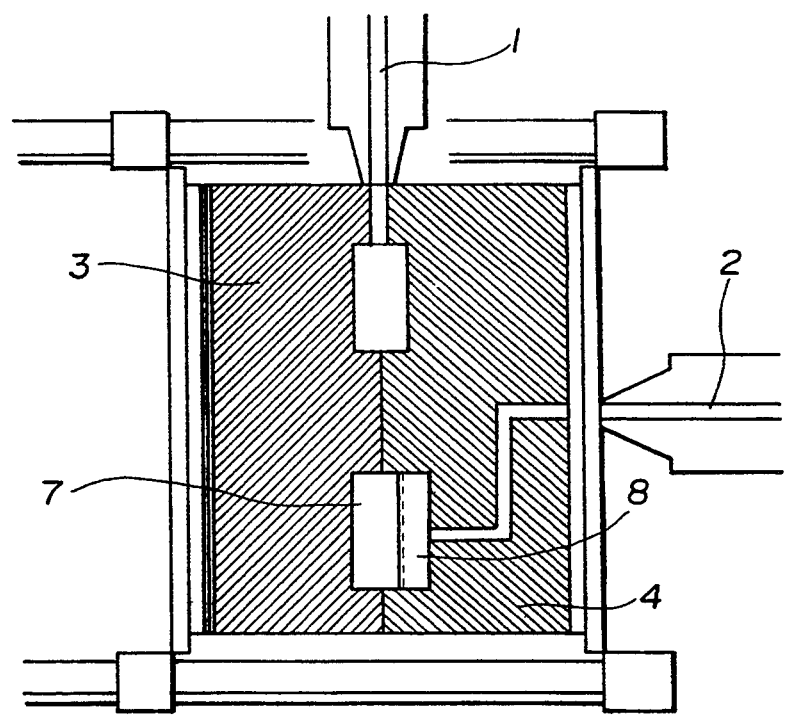
FIG. 5 is a schematic cross-sectional view similar to FIG. 2 at a stage when a silicone rubber composition is injection molded.

Then a composition containing 100 parts of liquid addition type silicone rubber composition (I) and 0.5 or 1 part of the compound of formula (D) or (E) used in Example 2 was injected against the exposed surface of the resin sheet 7 through the nozzle 2 to mold a rubber sheet 8 as shown in FIG. 5. The molding conditions included an injection time of 6 seconds and a curing time of 90 seconds while the left and right mold halves 3 and 4 were at temperatures of 100° C. and 120° C., respectively.

Figure 6:
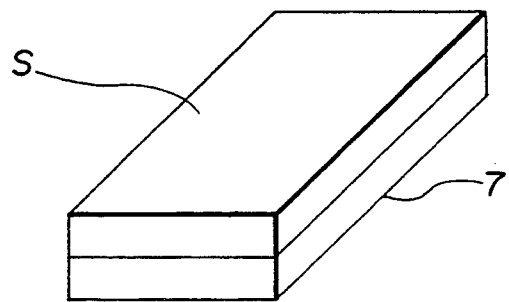
FIG. 6 is a perspective view of a molded article obtained from the stage of FIG. 5.

The foregoing procedure yielded a composite molded article as shown in FIG. 6 wherein the resin and rubber sheets 7 and 8 were firmly joined together. Both the sheets were of the same dimensions: 2.5 mm wide, 15 cm long, and 2 mm thick. All composite molded articles obtained from the compositions having 0.5 to 1 part of the compounds of formulae (D) and (E) used in Example 2 were firmly integrated and had satisfactory dimensional precision and production yields. The rubber sheets could be readily released from the mold made of chromium-plated carbon steel.

Comparative Example 2

Composite molded articles as shown in FIG. 6 were prepared by the same procedure as in Example 3 except that the modified polycarbonate resin was replaced by an unmodified polycarbonate. The articles were examined for adhesion to find that the resin sheet was readily separated from the silicone rubber sheet.

Although some preferred embodiments have been described, many modifications and variations may be made thereto in the light of the above teachings. It is therefore to be understood that within the scope of the appended claims, the invention may be practiced otherwise than as specifically described.

We claim:

1. A polycarbonate resin/silicone rubber integrally molded article wherein a polycarbonate resin having an aliphatic unsaturated group or a composition containing the same is integrally joined to an addition type silicone rubber containing a tackifier component.

2. The article of claim 1 wherein said tackifier component is a compound containing an alkoxysilyl group, glycidyl group or acid anhydride group.

3. The article of claim 1 wherein said tackifier component is a compound containing at least one hydrogen atom directly attached to a silicon atom and having a phenyl skeleton.

4. A method for preparing polycarbonate resin/silicone rubber integrally molded article, comprising the steps of:
    molding a polycarbonate resin having an aliphatic unsaturated group or a composition containing the same into a preform,
    contacting an adhesive silicone rubber composition with a surface of the preform, said silicone rubber composition containing (a) an alkenyl group-containing organopolysiloxane, (b) an organohydrogenpolysiloxane having at least two hydrogen atoms each directly attached to a silicon atom in a molecule, (c) an addition reaction catalyst, and (d) a tackifier component,
    curing the silicone rubber composition at a temperature lower than the softening point of said polycarbonate resin or composition containing the same.

5. The method of claim 4 wherein the molding and contacting steps are carried out by injection molding.

6. The method of claim 4 or 5 wherein said tackifier component is a compound containing an alkoxysilyl group, glycidyl group or acid anhydride group.

7. The method of claim 4 or 5 wherein said tackifier component is a compound containing at least one hydrogen atom directly attached to a silicon atom and having a phenyl skeleton.

8. The polycarbonate resin/silicone rubber integrally molded article according to claim 1, wherein the aliphatic unsaturated group in the polycarbonate resin is a double or triple bond.

9. The polycarbonate resin/silicone rubber integrally molded article according to claim 8, wherein the aliphatic unsaturated group in the polycarbonate resin is selected from the group consisting of a vinyl, allyl and isopropenyl group.

10. The polycarbonate resin/silicone rubber integrally molded article according to claim 1, wherein the polycarbonate resin having an aliphatic unsaturated group has a viscosity average molecular weight of about 2,000 to 100,000.

11. The polycarbonate resin/silicone rubber integrally molded article according to claim 1, wherein the polycarbonate resin having an aliphatic unsaturated group have a viscosity average molecular weight of about 5,000 to 30,000.

12. The polycarbonate resin/silicone rubber integrally molded article according to claim 1, wherein the addition type silicone rubber is obtained by curing an adhesive silicone rubber composition comprising (a) an alkenyl group-containing organopolysiloxane, (b) an organohydrogenpolysiloxane having at least two hydrogen atoms each directly attached to a silicon atom in a molecule, (c) an addition reaction catalyst, and (d) a tackifier component.

13. The polycarbonate resin/silicone rubber integrally molded article according to claim 12, wherein the alkenyl group-containing organopolysiloxane has a viscosity of about 100 to 100,000 cp at room temperature.

14. The polycarbonate resin/silicone rubber integrally molded article according to claim 12, wherein the alkenyl group-containing organopolysiloxane is selected from the group consisting of:

 

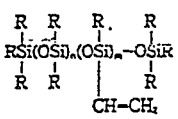 and 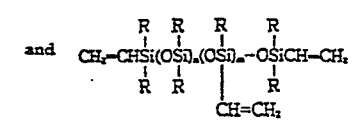

wherein r is a substituted or unsubstituted monovalent hydrocarbon group and m and n are positive numbers and m+n is from 100 to 5,000 and m/(m+n) is from 0.001 to 0.1.

15. The polycarbonate resin/silicone rubber integrally molded article according to claim 12, wherein the content of the organohydrogenpolysiloxane is 0.4 to 5 equivalents per alkenyl group in the alkenyl group-containing organopolysiloxane.

16. The polycarbonate resin/silicone rubber integrally molded article according to claim 12, wherein the content of the organohydrogenpolysiloxane is 0.8 to 2 equivalents per alkenyl group in the alkenyl group-containing organo polysiloxane.

17. The polycarbonate resin/silicone rubber integrally molded article according to claim 12, wherein the addition reaction catalyst is platinum, a platinum compound, or a rhodium compound.

18. The polycarbonate resin/silicone rubber integrally molded article according to claim 12, wherein the content of the addition reaction catalyst is 0.1 to 1,000 ppm based on the total of the entire components.

19. The polycarbonate resin/silicone rubber integrally molded article according to claim 2, wherein the tackifier component is selected from the group consisting of

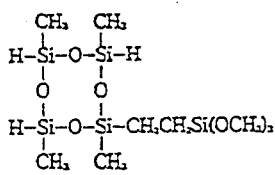

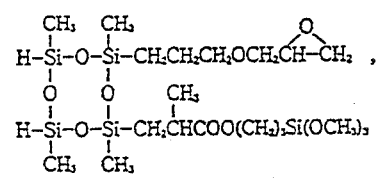

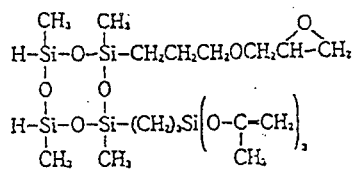

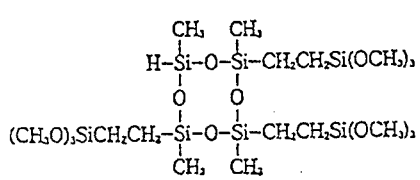

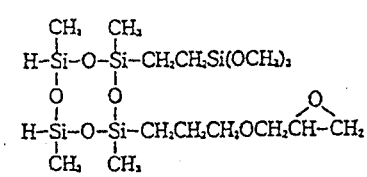

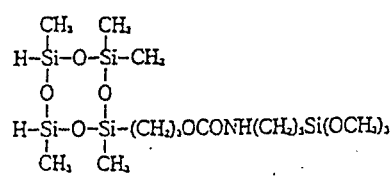

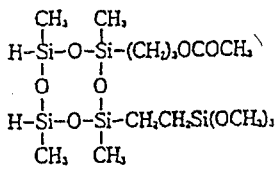

and

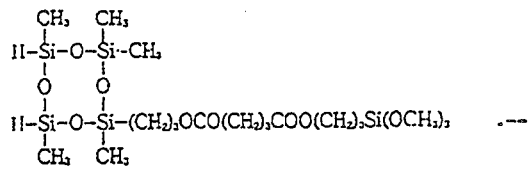

20. The polycarbonate resin/silicone rubber integrally molded article according to claim 3, wherein the phenyl skeleton in the tackifier component is selected from the group consisting of:

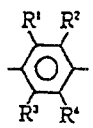   ...(1)

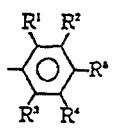   ...(2)

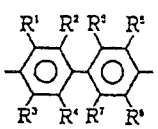   ...(3)

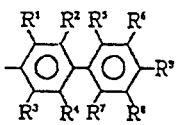   ...(4)

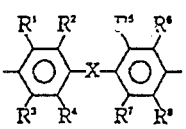   ...(5)   and

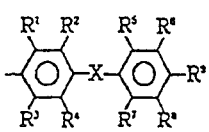   ...(6)

wherein each of $R^1$ to $R^9$, which may be identical or different, is a monovalent group selected from the group consisting of a hydrogen atom, halogen atom, substituted or unsubstituted monovalent hydrocarbon group having 1 to 8 carbon atoms, and alkoxy group having 1 to 6 carbon atoms;

X is a divalent group selected from the group consisting of

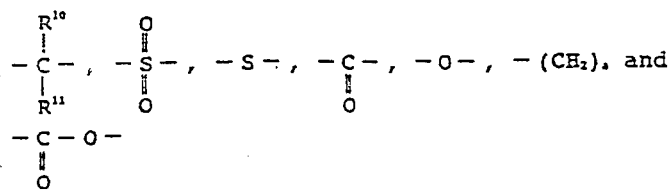

wherein each of $R^{10}$ and $R^{11}$, which may be identical or different, is a monovalent group selected from the group consisting of a hydrogen atom, halogen atom, and substituted or unsubstituted monovalent hydrocarbon group having 1 to 8 carbon atoms, or $R^{10}$ and $R^{11}$ taken together form a carboxylic or heterocyclic ring, and letter a is an integer of at least 2.

21. The polycarbonate resin/silicone rubber integrally molded article according to claim 3, wherein the tackifier component is selected from the group consisting of

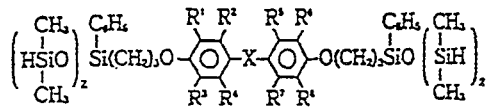

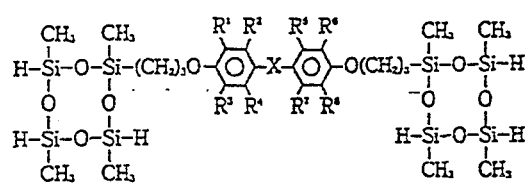

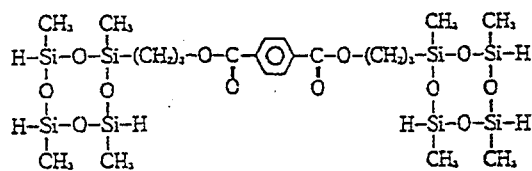

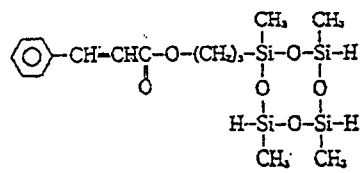

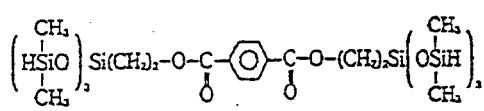

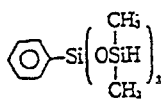 and

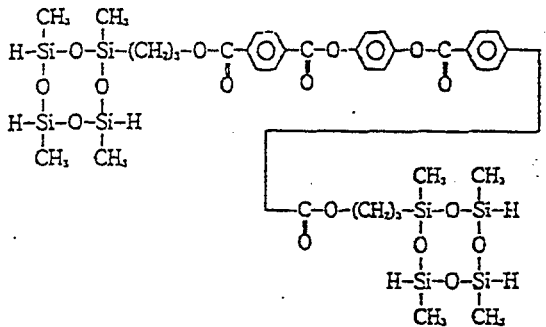

wherein $R^1$ to $R^8$, which may be identical or different, is a monovalent group selected from the group consisting of a hydrogen atom, halogen atom, substituted or unsubstituted monovalent hydrocarbon group having 1 to 8 carbon atoms, and alkoxy group having 1 to 6 carbon atoms; and X is a divalent group selected from the group consisting of

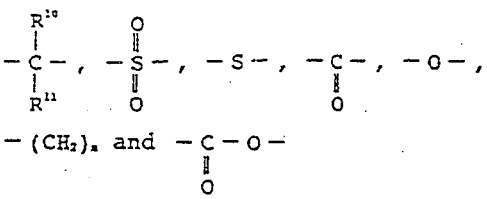

wherein each of $R^{10}$ to $R^{11}$, which may be identical or different, is a monovalent group selected from the group consisting of a hydrogen atom, halogen atom, and substituted or unsubstituted monovalent hydrocarbon group having 1 to 8 carbon atoms, or $R^{10}$ and $R^{11}$ taken together form a carboxylic or heterocyclic ring, and letter a is an integer of at least 2.

22. The polycarbonate resin/silicone rubber integrally molded article according to claim 12, wherein the amount of tackifier component is 0.01 to 50 parts by weight per 100 parts by weight of the alkenyl group-containing organopolysiloxane.

23. The polycarbonate resin/silicone rubber integrally molded article according to claim 12, wherein the amount of tackifier component is 0.1 to 5 parts by weight per 100 parts by weight of the alkenyl group-containing organopolysiloxane.

24. The polycarbonate resin/silicone rubber integrally molded article according to claim 12, wherein the adhesive silicone rubber composition further comprises finely divided silica.

25. The polycarbonate resin/silicone rubber integrally molded article according to claim 1, wherein the tackifier component is

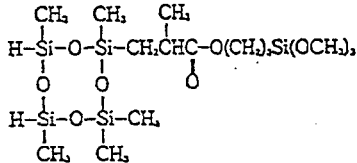

26. The polycarbonate resin/silicone rubber integrally molded article according to claim 1, wherein the tackifier component is

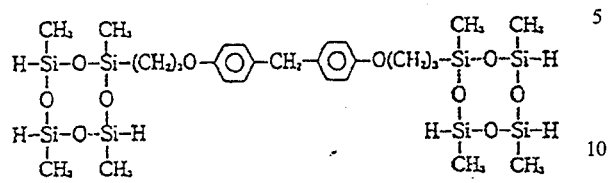

27. The method for preparing a polycarbonate resin/silicone rubber integrally molded article according to claim 4, wherein the alkenyl group-containing organo polysiloxane is selected from the group consisting of:

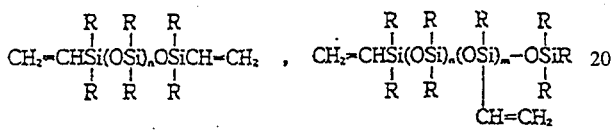

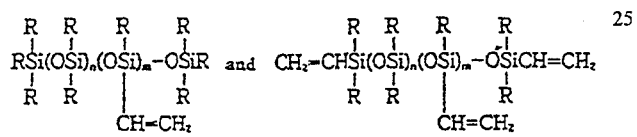

wherein R is a substituted or unsubstituted monovalent hydrocarbon group and m and n are positive numbers and m+n is from 100 to 5,000 and m/(m+n) is from 0.001 to 0.1.

28. The method for preparing a polycarbonate resin/silicone rubber integrally molded article according to claim 6, wherein the tackifier component is selected from the group consisting of

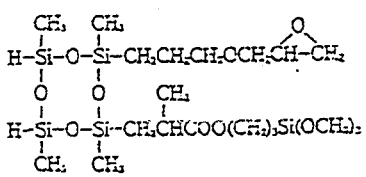

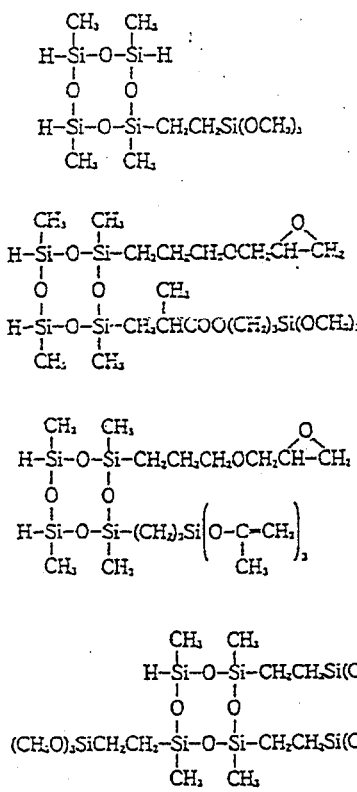

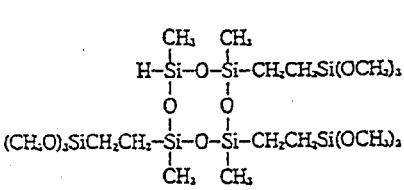

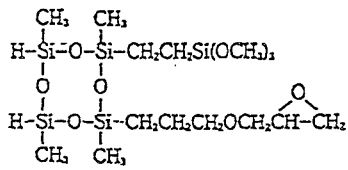

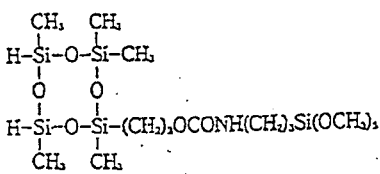

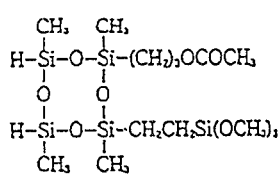

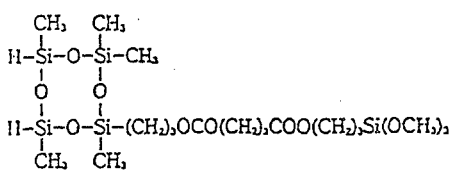

and

29. The method for preparing a polycarbonate resin/silicone rubber integrally molded article according to claim 7, wherein the tackifier component is selected from the group consisting of

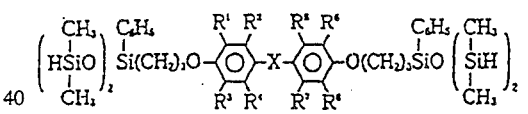

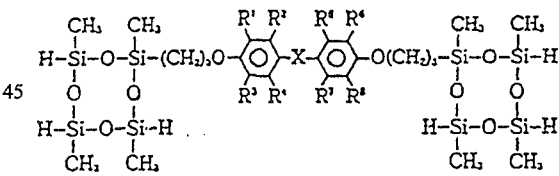

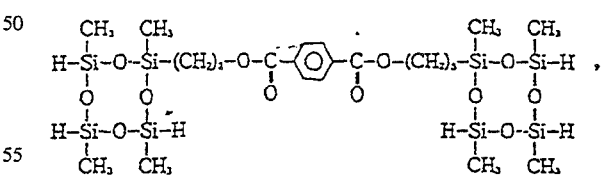

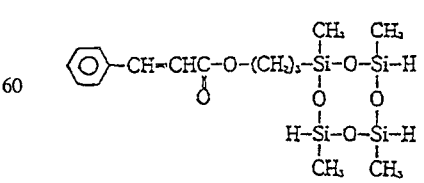

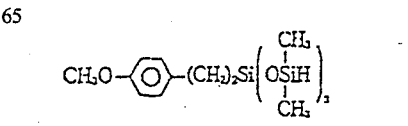

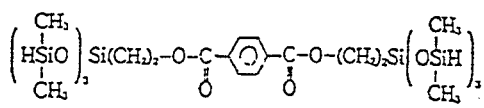

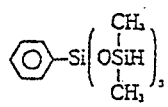 and

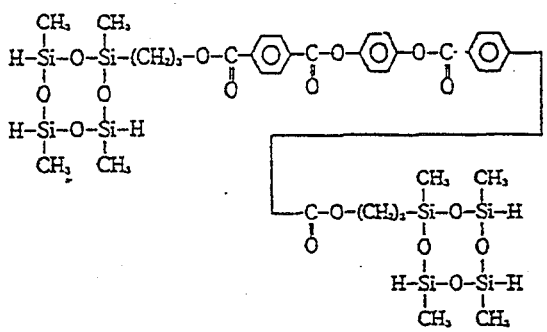

wherein $R^1$ to $R^8$, which may be identical or different, is a monovalent group selected from the group consisting of a hydrogen atom, halogen atom, substituted or unsubstituted monovalent hydrocarbon group having 1 to 8 carbon atoms, and alkoxy group having 1 to 6 carbon atoms; and X is a divalent group selected from the group consisting of

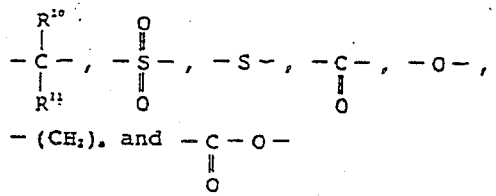

wherein each of $R^{10}$ to $R^{11}$, which may be identical or different, is a monovalent group selected from the group consisting of a hydrogen atom, halogen atom, and substituted or unsubstituted monovalent hydrocarbon group having 1 to 8 carbon atoms, or $R^{10}$ and $R^{11}$ taken together form a carboxylic or heterocyclic ring, and letter a is an integer of at least 2.

30. The method for preparing a polycarbonate resin/silicone rubber integrally molded article according to claim 4, wherein the tackifier component is

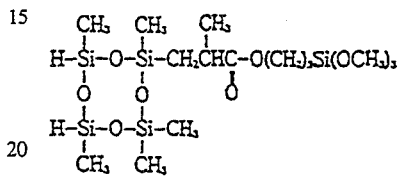

31. The method for preparing a polycarbonate resin/silicone rubber integrally molded article according to claim 4, wherein the tackifier component is

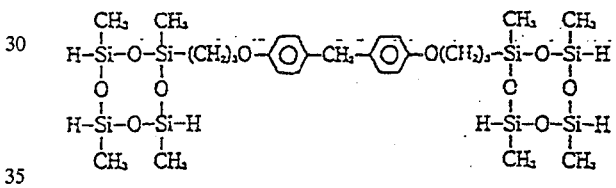

* * * * *